(12) United States Patent
Howell

(10) Patent No.: US 8,882,154 B1
(45) Date of Patent: Nov. 11, 2014

(54) PIPE COUPLING

(71) Applicant: Larry D. Howell, Longview, TX (US)

(72) Inventor: Larry D. Howell, Longview, TX (US)

(73) Assignee: Clean Blast Services, Inc., Kennedale, TX (US)

(*) Notice: Subject to any disclaimer, the term of this patent is extended or adjusted under 35 U.S.C. 154(b) by 36 days.

(21) Appl. No.: 13/761,805

(22) Filed: Feb. 7, 2013

Related U.S. Application Data

(60) Provisional application No. 61/600,914, filed on Feb. 20, 2012.

(51) Int. Cl.
F16L 17/00 (2006.01)
F16L 17/10 (2006.01)

(52) U.S. Cl.
CPC .................. F16L 17/10 (2013.01)
USPC .................. 285/97; 138/99; 285/100

(58) Field of Classification Search
CPC .................. F16L 37/63; F16L 17/10
USPC ........... 285/100, 15, 96, 97; 277/605; 138/97, 138/99
See application file for complete search history.

(56) References Cited

U.S. PATENT DOCUMENTS

| | | | |
|---|---|---|---|
| 2,465,848 A | 3/1949 | Collins et al. | |
| 2,523,716 A | 9/1950 | Parr | |
| 2,742,305 A | 4/1956 | Converse, III et al. | |
| 3,023,995 A | 3/1962 | Hopkins | |
| 3,033,594 A | 5/1962 | Cushman | |
| 3,810,665 A | 5/1974 | Rodgers | |
| 3,843,167 A | 10/1974 | Gronstedt | |
| 4,026,584 A | 5/1977 | Lowe | |
| 4,202,379 A * | 5/1980 | Vetter | 138/99 |
| 4,276,945 A | 7/1981 | Ward, Sr. | |
| 4,448,218 A | 5/1984 | Vetter | |
| 4,741,561 A | 5/1988 | Morita et al. | |
| 4,772,050 A | 9/1988 | Buehler et al. | |
| 4,786,087 A | 11/1988 | Thewlis et al. | |
| 5,333,916 A | 8/1994 | Burkit et al. | |
| 5,595,405 A | 1/1997 | Knutsen | |
| 5,868,524 A | 2/1999 | Martin | |
| 8,419,071 B2 * | 4/2013 | Gentille | 285/97 |

OTHER PUBLICATIONS

BlueScope Pipeline Supplies, Processing Capabilities, photo of grooving pipe coupling, www.bluescopepipelinesupplies.com.au/processing-capabilities, 2 pages.
BlueScope Pipeline Supplies, photo of pipe coupling, www.bluescopepipelinesupplies.com.au/sites/default/files, 1 page.

* cited by examiner

Primary Examiner — Aaron Dunwoody
(74) Attorney, Agent, or Firm — Geoffrey A. Mantooth

(57) ABSTRACT

A pipe coupling has an outer shell with a flexible inner liner therein. The liner is secured to the shell by a clamping arrangement, which uses inner rings at the ends of the shell. The inner rings are hydraulically expanded out to the shell to form a seal between the shell and the liner. In use, compressed fluid is provided to a cavity between the liner and the shell to force the liner to seal against a pipe joint.

15 Claims, 5 Drawing Sheets

PIPE COUPLING

This application claims the benefit of U.S. provisional patent application Ser. No. 61/600,914 filed Feb. 20, 2012.

FIELD OF THE INVENTION

The present invention relates to couplings for sealing a pipe joint.

BACKGROUND OF THE INVENTION

There are many applications where a quick, efficient way to join lengths of pipe together in a leak proof manner is needed. For example, pipe conveying water to a work site, such as an oil or gas well site, requires couplings between the lengths of pipe. The pipe itself lacks structure for joining one length of pipe to another, so couplings about the exterior of the pipe joints are used.

The prior art has numerous types of couplings. One type of prior art pipe coupling uses a gasket between the adjacent ends of a pipe. A metal band clamps around the gasket and the outside diameter of the pipe, with the band fitting into circumferential grooves in the pipe. Another type of pipe coupling uses an HDPE sleeve over the pipe joint. The sleeve is welded into place with electro-fusion. Still another type of coupling uses a rubber sleeve inside of a rigid shell. The coupling is fit over the pipe joint. Compressed air expands the rubber sleeve around the pipe joint, forming a seal. This type of coupling is exemplified by U.S. Pat. No. 4,026,584.

These prior art couplings either leak, or are too expensive, or are difficult to install.

SUMMARY OF THE INVENTION

A pipe coupling has an outer cylindrical shell with first and second ends. An elastomeric sleeve is located inside of the outer shell and has ends and end portions. Each sleeve end is adjacent to a respective one of the first or second ends of the shell. An inner ring is located at each of the shell first and second ends. The sleeve end portions are located between the inner rings and the shell. The inner rings are pressed out to the shell to retain the sleeve to the shell and the sleeve end portions to retain and seal the sleeve to the shell. A cavity is between the sleeve and the shell. The shell has an opening that communicates with the cavity. The sleeve is movable relative to the shell. The sleeve and the inner rings form an interior for receiving a pipe joint. The sleeve expands from the shell to seal around the pipe joint.

In accordance with one aspect, the inner rings are hydraulically expanded into the shell.

In accordance with another aspect, the sleeve has a smooth inside surface.

In accordance with another aspect, the sleeve has a uniform cross-sectional thickness between the ends when the sleeve is unexpanded.

In accordance with another aspect, the ends of the sleeve are uncovered by the shell and the inner rings.

In accordance with another aspect, fasteners extend through the shell, the sleeve and the inner rings.

In accordance with another aspect, the fasteners each have an inner end that is flush with an inside diameter of the inner rings.

In accordance with another aspect, the shell is more rigid than the sleeve.

In accordance with another aspect, a handle is coupled to an outside diameter of the shell.

In accordance with another aspect, the inner rings are hydraulically expanded into the shell. The sleeve has an inside smooth surface. The sleeve has a uniform cross-sectional thickness between the ends when the sleeve is unexpanded. The ends of the sleeve are uncovered by the shell and the inner rings. The shell is more rigid than the sleeve.

A pipe coupling comprises an outer cylindrical shell having first and second ends. An elastomeric sleeve is located inside of the outer shell and has ends and end portions. Each sleeve end is adjacent to a respective one of the first or second end of the shell. First and second inner rings are located inside of the respective first and second ends of the shell. The sleeve end portions are located between the respective first and second inner rings and the shell. The sleeve end portions are compressed between the shell and the first and second inner rings so as to form respective seals between the sleeve and the shell. The first and second inner rings each have outer ends which are unconnected to the shell. The sleeve has a middle portion between the first and second inner rings. There is a cavity between the shell and the middle portion of the sleeve. The sleeve first and second inner rings form an interior for receiving a pipe joint. The shell has an opening that communicates with the cavity, wherein the cavity can expand to expand the sleeve.

In accordance with one aspect, each of the inner rings has a cylindrical inside surface and a cylindrical outside surface.

In accordance with another aspect, the sleeve has an inside diameter at each of the sleeve end portions when the sleeve is located in the shell and before the first and second rings are installed. The first and second rings have an outside diameter that is larger than the sleeve inside diameter.

In accordance with another aspect, the sleeve has a first wall thickness at its ends and a second wall thickness at the middle portion. The first wall thickness is less than the second wall thickness.

In accordance with another aspect, the sleeve ends are uncovered by the shell and the first and second rings.

DESCRIPTION OF THE PREFERRED EMBODIMENT

Figure 1:
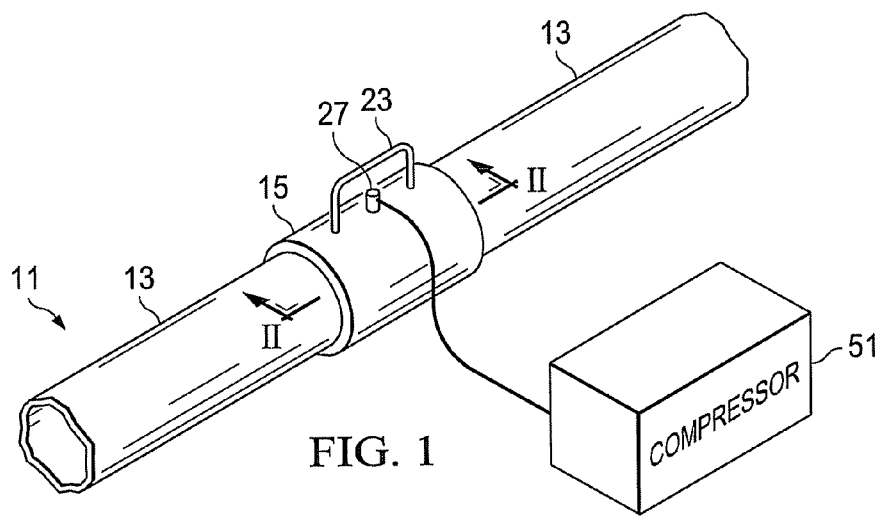
FIG. 1 is a perspective view of a pipeline utilizing the pipe coupling.
Figure 2:
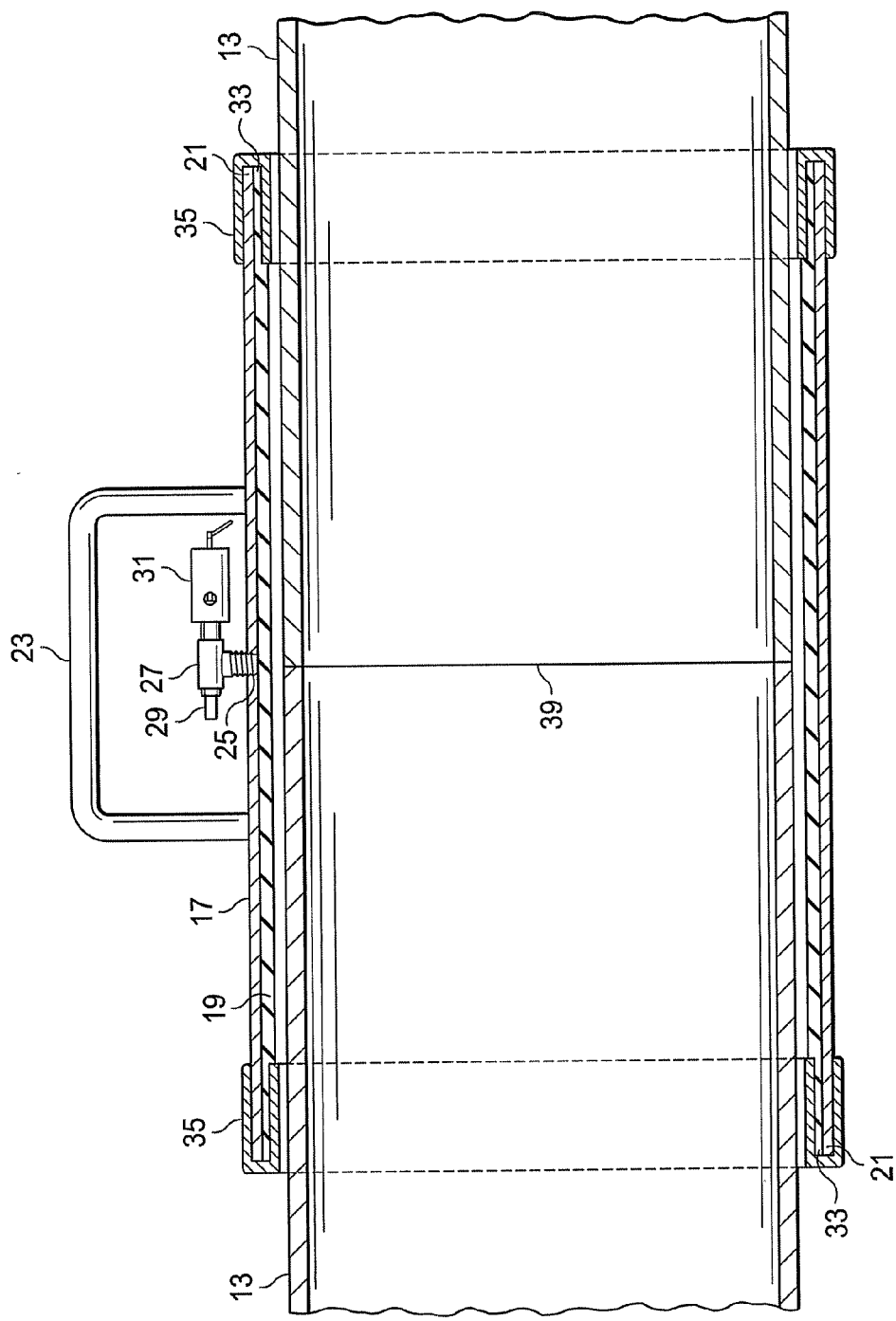
FIG. 2 is a cross-sectional view of the pipe coupling installed on a pipe joint, but not yet inflated.
Figure 6:
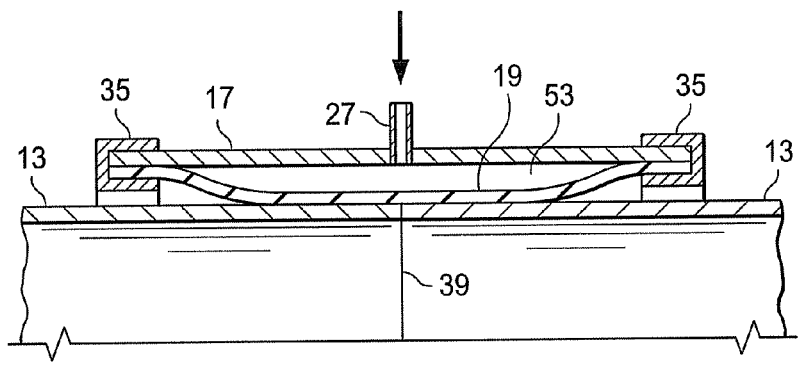
FIG. 6 is a cross-sectional view of a portion of the pipe coupling shown inflated and providing a seal around the pipe joint.

FIG. 1 shows a pipeline 11 equipped with the pipe coupling 15. The pipeline is made up of lengths of pipe 13. The pipe 13 can be of any dimension. The pipe can be of any pipe material, such as aluminum, steel, cast iron, plastic, composite, etc. The pipe can be used for most applications. For example, the pipe can carry water such as potable, non-potable, or sewer water. The pipe comes in lengths, which lengths are joined together by the pipe coupling 15. The ends of the pipe 13 need not have threads or any of the like. Instead, as shown in FIGS. 2 and 6, the ends can be butted against one another. A coupling 15 is used for each pipe joint.

The pipe coupling provides an inexpensive, easy to use, reliable, leak proof coupling. The coupling can be made with few components so as to reduce the cost. Provided with a handle and light in weight, the coupling can easily be installed onto the pipe ends and pipe joint. Sealing the pipe joint merely provides providing compressed air or some other fluid inside the coupling. Once the seal is made, the coupling holds the seal for the duration of the pipeline.

The coupling also allows the pipeline to be easily disassembled. The coupling can be reused.

In the description that follows, like reference numbers mean like components.

Figure 3:
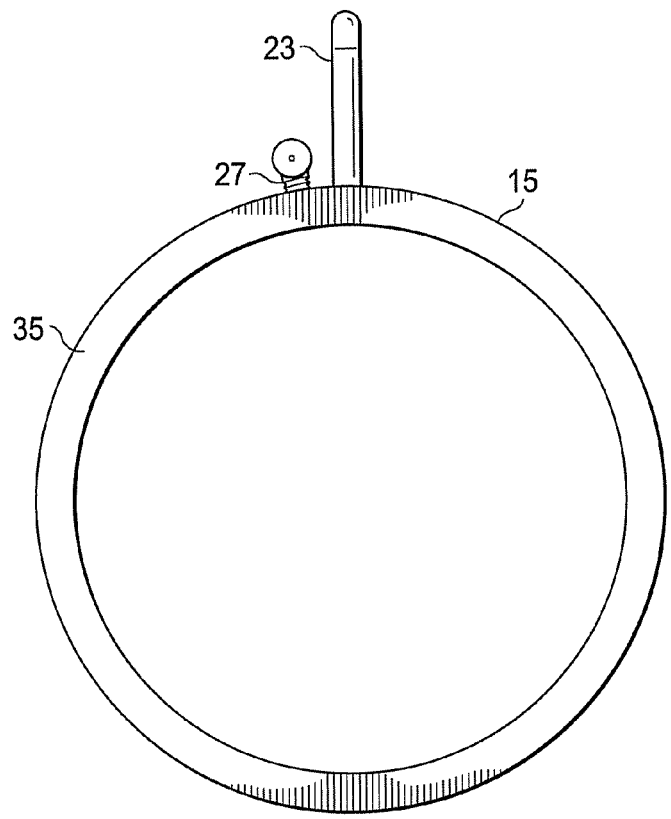
FIG. 3 is an end view of the pipe coupling.
Figure 4:
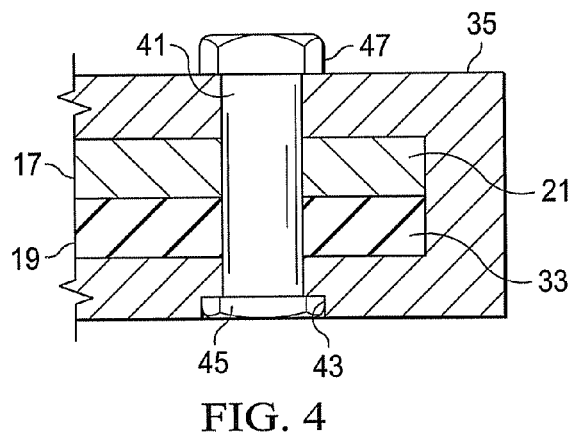
FIG. 4 is a detail cross-sectional view of a clamp showing one arrangement.

Referring to FIGS. 2-4, the pipe coupling 15 has an outer shell 17 and an inner liner or shell 19. The inner liner 19 is nested or located inside of the outer shell 17.

The outer shell 17 is typically made of metal, although it could be made of other material, such as plastic or composite. The outer shell is pipe-like, having an inside diameter and two ends 21. The outer shell has a wall thickness. The wall thickness is selected based upon the particular application. Higher pipeline pressures require a larger outer shell wall thickness than do lower pressures. For example, for a water pipe of less than 100 psi, an aluminum outer shell can have a wall thickness of ⅛"-3/16". A handle 23 projects out from the outer shell. The handle is useful for putting the coupling in place on the pipeline.

The outer shell has an opening 25 therein; the opening is equipped with a fitting 27 and a valve 29. The valve is normally closed. In the preferred embodiment, the fitting 27 is centered between the two ends 21. The fitting can optionally be provided with a pressure relief valve 31.

The inner liner 19 is elastomeric and can be made of rubber (such as gum rubber) or other materials. The inner liner can withstand contact with the fluids in the pipeline without disintegrating or becoming leaky. The inner liner is also pipe-like, or a sleeve, and has two ends 33. The length of the inner liner is the same as the length of the outer shell. The outside diameter of the inner liner is slightly smaller than the inside diameter of the outer shell. It is preferred if the inner liner fits inside of the outer shell such that the inner liner presents a smooth inside surface and is free of wrinkles. The thickness of the inner liner is sufficient for it to withstand the pipe pressures without damage such as rupture. The inner liner 19 has a wall of uniform thickness. The inside surface of the inner liner is smooth, with no protrusions.

The ends 21, 33 of the outer shell and inner liner are coupled together by clamps 35. Each clamp is a metal ring having a "C" shape in cross-section, as shown in FIGS. 2 and 4. The respective ends 21, 33 of the outer shell 17 and inner liner 19 are inserted into a clamp. Sealant is provided between the clamp and the outer shell, the clamp and the inner liner and between the outer shell and inner liner. Once the ends of the outer shell and inner liner are installed in the clamp, the free ends of the clamp are squeezed or clamped together. A hydraulic crimping unit can be used to squeeze or crimp the clamps 35.

The clamps can be provided with radially extending bolts 41 for increased mechanical coupling. Referring to FIG. 4, which shows a detail view corresponding to the clamp portion in the upper right of FIG. 2, each clamp 35 has a series of bolts extending from the inside diameter out. The bolts extend through the inner liner 19 and the outer shell 17. The bolt head 45 is located in a countersink 43 so as to be flush with the clamp inside diameter. The bolt can be a hex drive type. A nut 47 is located on the bolt, on the outside diameter of the clamp. The bolts 41 are spaced out circumferentially around each clamp 35.

Figure 5:
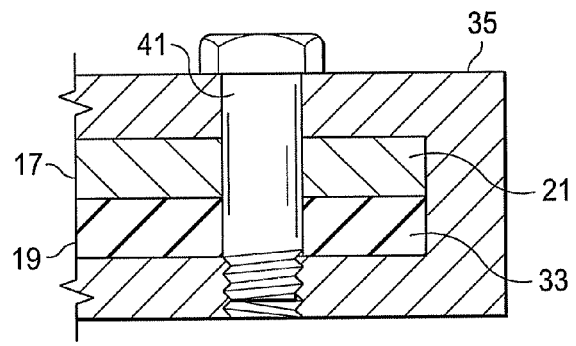
FIG. 5 is a detail cross-sectional view of a clamp showing another arrangement.

Still another clamp arrangement is shown in FIG. 5. Bolts 41 extend radially inward from the outside diameter. The bolt head bears on the outside diameter of the clamp. The inside portion of each clamp is threaded to receive the bolt 47. The threaded end of the bolt should either be flush or recessed with the clamp inside diameter to avoid interfering with the sealing function of a coupling. The bolts 41 are provided circumferentially around each clamp 35.

Figure 7:
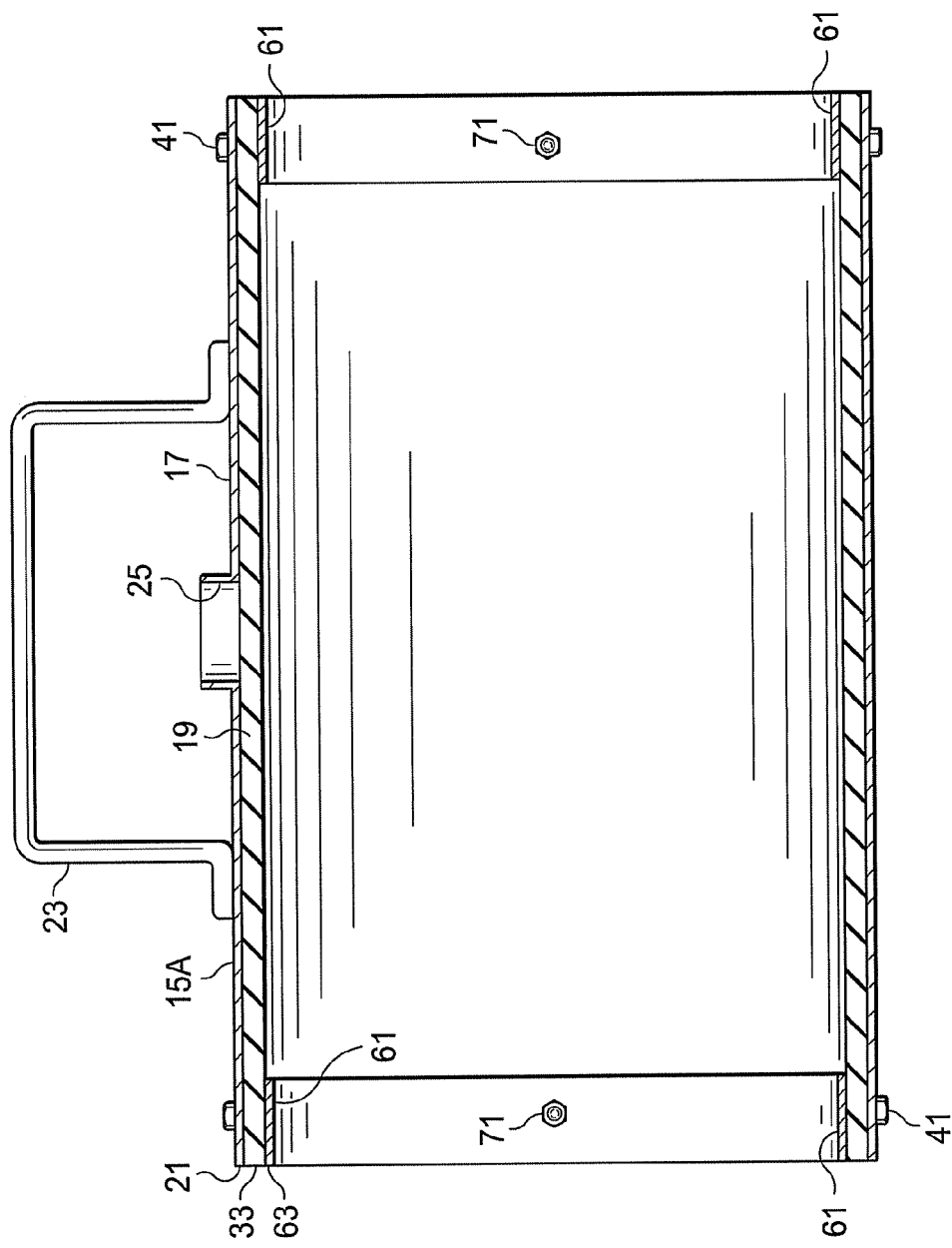
FIG. 7 is a longitudinal cross-sectional view of the pipe coupling in accordance with another embodiment taken along lines VII-VII of FIG. 8.
Figure 8:
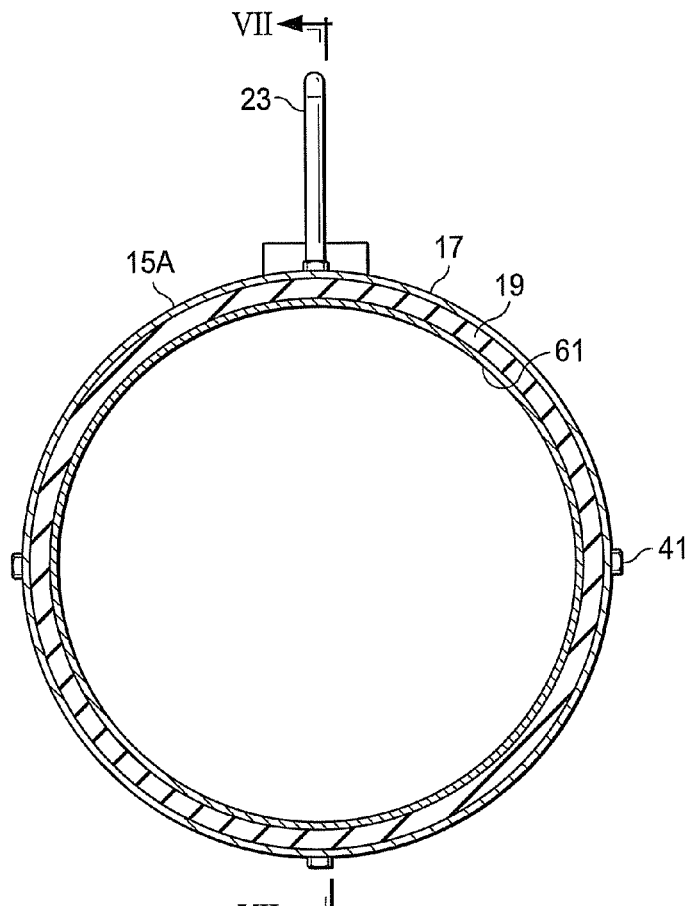
FIG. 8 is an end view of the pipe coupling of FIG. 7.
Figure 9:
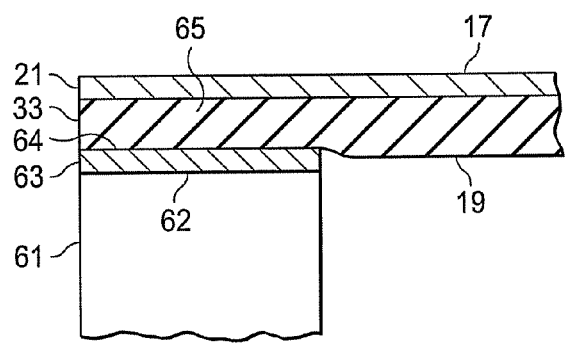
FIG. 9 is a detail longitudinal cross-sectional view of the inner ring and liner.

FIGS. 7-9 show another embodiment of the coupling 15A.

The inner liner 19 is joined to the outer shell 17 by inner rings 61, one in each end portion. In addition, the inner rings form the seal between the ends of the inner liner and the outer shell. The inner rings 61 are separate components from the outer shell 17. In the preferred embodiment, the inner rings each have a cylindrical inside surface 62 and a cylindrical outside surface 64 (see FIG. 9). Before assembly, the outside diameter of each inner ring is less than the inside diameter of the inner liner. This allows the liner 19 to be installed into the outer shell 17 and the inner rings 61 to be inserted into the end portions of the inner liner 19. The outer ends 63 of the inner rings 61 are flush with the ends of the outer shell and inner liner. The inner rings extend longitudinally into the pipe coupling for a distance that is sufficient to form a seal and couple the inner liner to the outer shell.

To couple or retain the inner liner to the outer shell, the inner rings 61 are hydraulically expanded toward the outer shell 17. The outer shell is located in a mold. Water or some other fluid is introduced into the interior of the coupling under high pressure, which expands the inner rings 61, but not the outer shell which is constrained by the mold. Once the inner rings are expanded, the outside diameter of the inner rings is increased and now greater than the inside diameter of the inner shell. The end portions 65 of the inner liner are compressed between the expanded inner rings and the outer shell, thus forming a circumferential seal at each end (see FIG. 9). In addition, this forms a strong attachment, with the inner rings retaining the inner liner to the outer shell. The wall thickness of each end portion 65 of the inner liner 19 is less than the wall thickness of the inner liner elsewhere due to being clamped between the inner ring and outer shell (see FIG. 9). Also, the wall thickness of the expanded inner rings is reduced slightly from the unexpanded inner rings. The ends 33 of the inner liner 19 are exposed and uncovered by the inner rings. Likewise, the outer ends 63 of the inner rings 61 are exposed. Even though the ends 33 of the liner may bulge slightly, the ends are effectively flush with the ends of the outer shell and inner rings.

The hydraulic expansion of the inner rings 61 provides a suitable retention and seal of the inner liner. The outer ends 63 of the inner rings are unconnected to the shell 17. However, bolts 41 can be used to provide additional security. The bolts 41 extend through the outer shell 17, the inner liner 19 and into the inner rings 61. Nuts 71 secure the bolts in place. The nuts are flush with the inside diameter of the inner rings.

To use the coupling 15, 15A, it is sized to the pipe 11 (see FIGS. 2 and 6). The inside diameter of the coupling, as measured inside of a clamp, should be at least ¼" larger than the outside diameter of the pipe. (In FIG. 6, the gap between the clamps 35 and the pipe 13 is exaggerated to better illustrate the flex of the inner liner 19.) The length of the coupling 15, 15A should be such that it covers a sufficient portion of the end of each pipe to make a seal. For example, for a pipe diameter of X, the coupling extends at least the same X distance, or longer, over the end of each pipe. The two pipe ends, which are clean and dry, are inserted into the coupling, with the pipe joint 39 being approximately centered in the coupling.

A compressor 51 (see FIG. 1), or other source of pressurized fluid, it connected to the fitting 27. In the preferred embodiment, compressed air is used, although pressurized liquid could also be used. If the pipeline is to be buried, then foam can be used to deform the inner liner 19. Continuing with the example of compressed air, compressed air is provided to the space 53 between the outer shell 17 and the inner liner 19. The outer shell is rigid and stiff compared to the inner liner. The outer shell 17 remains rigid, while the inner liner 19 is forced away from the outer shell and deforms or inflates (see FIG. 6), contacting the entire circumference around each of the pipe ends. The inner liner forms a circumferential seal around each of the pipe ends. The seal extends from the pipe joint along a length of the pipe. Once pressurized, the outer shell is rigid and stiff.

The pressure applied to deform the inner liner 19 is greater than the pipeline pressure. For example, if the pipeline pressure is 60 psi, then the liner pressure is more, such as 65 psi or higher. If the pipeline pressure is 100 psi, then the liner pressure is at least 110 psi. If the pipeline experiences pressure surges, then the liner pressure should be increased to accommodate such surges.

Once the liner has been pressurized, the compressor can be disconnected from the fitting. If, upon testing the coupling, some leakage is observed, then the liner pressure can be increased by reconnecting the compressor and injecting additional compressed air or other fluid.

To disassemble the pipeline, the valve can be opened to vent the air and deflate the liner. If foam has been used to inflate the liner, then the coupling can be cut away.

The coupling provides a low cost, easy to use device for sealing a pipe joint. The coupling can be used on a variety of pipe types, even those pipes with rough or irregular outer surfaces. If a pipe has a particularly irregular outer surface, then the coupling can be made longer so as to seal against a longer portion of the pipe length.

The coupling not only joins two lengths of pipe together but provides a leak-tight seal. Many prior art couplings are leaky.

The foregoing disclosure and showings made in the drawings are merely illustrative of the principles of this invention and are not to be interpreted in a limiting sense.

The invention claimed is:

1. A pipe coupling, comprising:
   a) an outer cylindrical shell having first and second ends;
   b) an elastomeric sleeve located inside of the outer shell and having ends and end portions, with each sleeve end adjacent to a respective one of the first or second ends of the shell;
   c) an inner ring located at each of the shell first and second ends, the sleeve end portions located between the inner rings and the shell, the inner rings pressed out to the shell and the sleeve end portions to retain and seal the sleeve to the shell;
   d) a cavity between the sleeve and the shell, the shell having an opening that communicates with the cavity, the sleeve being movable relative to the shell, the sleeve and the inner rings forming an interior for receiving a pipe joint, wherein the sleeve expands from the shell to seal around the pipe joint.

2. The pipe coupling of claim 1 wherein the inner rings are hydraulically expanded into the shell.

3. The pipe coupling of claim 1 wherein the sleeve has a smooth inside surface.

4. The pipe coupling of claim 1 wherein the sleeve has a uniform cross-sectional thickness between the ends when the sleeve is unexpanded.

5. The pipe coupling of claim 1 wherein the ends of the sleeve are uncovered by the shell and the inner rings.

6. The pipe coupling of claim 1 further comprising fasteners extending through the shell, the sleeve and the inner rings.

7. The pipe coupling of claim 6 wherein the fasteners each have an inner end that is flush with an inside diameter of the inner rings.

8. The pipe coupling of claim 1 wherein the shell is more rigid than the sleeve.

9. The pipe coupling of claim 1 further comprising a handle coupled to an outside diameter of the shell.

10. The pipe coupling of claim 1, wherein:
    a) the inner rings are hydraulically expanded into the shell;
    b) the sleeve has a smooth inside surface;
    c) the sleeve has a uniform cross-sectional thickness between the ends when the sleeve is unexpanded;
    d) the ends of the sleeve are uncovered by the shell and the inner rings;
    e) the shell is more rigid than the sleeve.

11. A pipe coupling, comprising:
    a) an outer cylindrical shell having first and second ends;
    b) an elastomeric sleeve located inside of the outer shell and having ends and end portions, with each sleeve end adjacent to a respective one of the first or second end of the shell;
    c) first and second inner rings located inside of the respective first and second ends of the shell, with the sleeve end portions located between the respective first and second inner rings and the shell, the sleeve end portions being compressed between the shell and the first and second inner rings so as to form respective seals between the sleeve and the shell, the first and second inner rings each having outer ends which are unconnected to the shell;
    d) the sleeve having a middle portion between the first and second inner rings, there being a cavity between the shell and the middle portion of the sleeve, the sleeve first and second inner rings forming an interior for receiving a pipe joint;
    e) the shell having an opening that communicates with the cavity, wherein the cavity can expand to expand the sleeve.

12. The pipe coupling of claim 11 where each of the inner rings has a cylindrical inside surface and a cylindrical outside surface.

13. The pipe coupling of claim 11, wherein:
    a) the sleeve has an inside diameter at each of the sleeve end portions when the sleeve is located in the shell and before the first and second rings are installed;
    b) the first and second rings have an outside diameter that is larger than the sleeve inside diameter.

14. The pipe coupling of claim 13 wherein the sleeve has a first wall thickness at its end portions and a second wall thickness at the middle portion, the first wall thickness being less than the second wall thickness.

15. The pipe coupling of claim 14 wherein the sleeve ends are uncovered by the shell and the first and second rings.

* * * * *